Figures 1, 2:
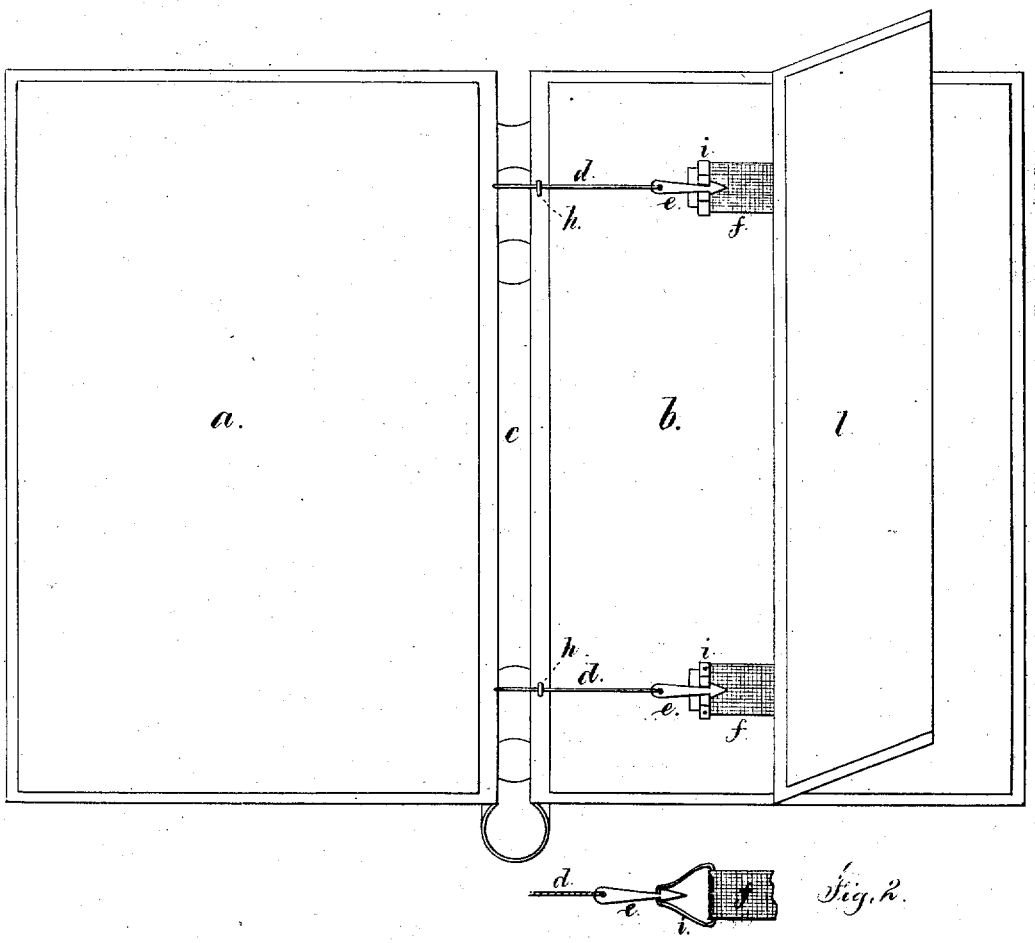

J. C. KOCH.

Portfolios.

No. 5,221. Reissued Jan. 7, 1873.

Witnesses

Chas. H. Smith

Geo. D. Walker.

Inventor

John C. Koch,

Lemuel W. Serrell atty.

UNITED STATES PATENT OFFICE.

JOHN C. KOCH, OF BROOKLYN, NEW YORK.

IMPROVEMENT IN PORTFOLIOS.

Specification forming part of Letters Patent No. 32,374, dated May 21, 1861; reissue No. 5,221, dated January 7, 1873.

*To all whom it may concern:*

Be it known that I, JOHN C. KOCH, of Brooklyn, in the county of Kings and State of New York, have invented an Improvement in Portfolios or Paper-Files, of which the following is a specification:

This portfolio or paper-file is adapted to the reception of music, letters, papers, sketches, manuscript, and other matters in sheets, either printed or written, and is a great convenience to professional and business men.

I make use of needles having spear-heads and attached to cords passing through eyes at the edges of the cover adjacent to the back, in combination with catches or loops that recieve the said spear-heads and elastic connections for such loops or catches, so that the needles will be retained in place, but the parts will yield for the introduction of additional sheets, or when the portfolio or sheets are opened for examination.

In the drawing I have represented said portfolio or binder by a perspective view, Figure 1; and in Fig. 2 the needle and an open wire loop are shown separately.

The covers *a* and *b* are united by a back, *c*, these parts being of any desired size or character. The cords *d* are connected at their ends to the cover *a*, and provided with the needles *e*. These cords should be double, and each cord passes through the eye of the needle that is threaded upon it. Each needle has a spear-shaped end or head, being, by preference, made of sheet-steel, sharpened at the end. The elastic strap or band *f* is fastened at one end to the cover *b*, and at the other end is connected to the loop *i*, that is constructed so as to receive the spear-head of the needle, and thereby connect the needle and the band *f*.

Two or more of these straps, loops, needles, and cords are provided in each portfolio or file; and when one or more sheets of paper or other materials are to be introduced into this file the needles *e* are to be thrust through the same at the proper points, and then threaded through the eyes *h* and laid in the loops or catches *i*, the elastic bands *f* being stretched sufficiently to allow for so doing. The said sheets will be retained at their back edges between the covers *a* and *b*; and, as an additional means for holding such sheets, the back *c* may be made with steel springs within the leather or material of the back, to form a back that can be expanded for the insertion of the sheets, and will contract upon them and cause them to be held at the junction of the back and covers. A flap, *l*, may be employed within the cover *b* to prevent the sheets coming into contact with the needles or loops.

I claim as my invention—

The needles *e* having spear-heads, in combination with the loops or catches *i*, elastic bands *f*, cords *d*, and eyes *h* upon the cover of the portfolio or binder, substantially as and for the purposes specified.

Signed by me this 19th day of December, A. D. 1872.

JOHN C. KOCH.

Witnesses:
GEO. T. PINCKNEY,
CHAS. H. SMITH.